US007687412B2

(12) United States Patent
Bhatnagar et al.

(10) Patent No.: US 7,687,412 B2
(45) Date of Patent: Mar. 30, 2010

(54) FLEXIBLE BALLISTIC COMPOSITES RESISTANT TO LIQUID PICK-UP METHOD FOR MANUFACTURE AND ARTICLES MADE THEREFROM

(75) Inventors: Ashok Bhatnagar, Richmond, VA (US); David A. Hurst, Richmond, VA (US); Brian D. Arvidson, Chester, VA (US); David A. Steenkamer, Midlolthian, VA (US); Lori L. Wagner, Richmond, VA (US)

(73) Assignee: Honeywell International Inc., Morristown, NJ (US)

( * ) Notice: Subject to any disclaimer, the term of this patent is extended or adjusted under 35 U.S.C. 154(b) by 141 days.

(21) Appl. No.: 11/213,253

(22) Filed: Aug. 26, 2005

(65) Prior Publication Data

US 2009/0025111 A1    Jan. 29, 2009

(51) Int. Cl.
*F41H 1/02* (2006.01)
*B32B 27/04* (2006.01)
*B32B 27/12* (2006.01)
*B32B 27/28* (2006.01)
*B32B 27/40* (2006.01)
*B32B 38/08* (2006.01)

(52) U.S. Cl. .................. 442/135; 442/134; 442/169; 442/268; 442/269; 442/271; 442/290; 442/366; 442/381; 442/392; 442/398; 428/105; 428/107; 428/109; 428/113; 428/114; 428/911; 428/912; 2/2.5

(58) Field of Classification Search .................. 442/164, 442/134, 135, 268, 269, 271, 275, 277, 278, 442/280, 281, 283, 381, 392, 394, 398; 428/911, 428/912
See application file for complete search history.

(56) References Cited

U.S. PATENT DOCUMENTS

| 3,671,542 A | 6/1972 | Kwolek et al. | 524/157 |
| 4,137,394 A | 1/1979 | Meihuizen et al. | 528/100 |
| 4,356,138 A | 10/1982 | Kavesh et al. | 264/164 |
| 4,403,012 A | 9/1983 | Harpell et al. | 428/290 |

(Continued)

FOREIGN PATENT DOCUMENTS

EP    0 585 793    3/1994

(Continued)

OTHER PUBLICATIONS

Tsabba, Yizhak, et al. "Effect of Coagulation Conditions on the Microfibrillar Network of a Rigid Polymer", Journal of Polymer Science: Part B: Polymer Physics, vol. 40, 1087-1094 (2002).*

(Continued)

*Primary Examiner*—Jennifer A Chriss
(74) *Attorney, Agent, or Firm*—Erika S. Wilson

(57) ABSTRACT

Flexible ballistic resistant composite material that has improved resistance to pick-up of water and other liquids, the composite material comprising a plurality of non-woven fibrous layers. The fibrous layers are formed from a network of high tenacity fibers (aramid fibers, extended chain polyethylene fibers and/or rigid rod fibers). The fibers are embedded in a matrix of a thermoplastic polyurethane resin. Preferably, at least two adjacent fiber layers are oriented in a cross-ply arrangement with respect to each other. Flexible armor, such as body vests, are provided which are formed at least in part from the flexible composite material.

27 Claims, 2 Drawing Sheets

U.S. PATENT DOCUMENTS

| | | | |
|---|---|---|---|
| 4,413,110 A | 11/1983 | Kavesh et al. | 526/348.1 |
| 4,457,985 A | 7/1984 | Harpell et al. | 428/224 |
| 4,501,856 A | 2/1985 | Harpell et al. | 525/423 |
| 4,543,286 A | 9/1985 | Harpell et al. | 428/288 |
| 4,563,392 A | 1/1986 | Harpell et al. | 428/394 |
| 4,584,347 A | 4/1986 | Harpell et al. | 525/119 |
| 4,613,535 A | 9/1986 | Harpell et al. | 428/113 |
| 4,623,574 A | 11/1986 | Harpell et al. | 428/113 |
| 4,650,710 A | 3/1987 | Harpell et al. | 428/263 |
| 4,681,792 A | 7/1987 | Harpell et al. | 428/102 |
| 4,737,401 A | 4/1988 | Harpell et al. | 428/252 |
| 4,737,402 A | 4/1988 | Harpell et al. | 442/187 |
| 4,748,064 A | 5/1988 | Harpell et al. | 428/113 |
| 4,820,568 A | 4/1989 | Harpell et al. | 428/113 |
| 4,883,700 A | 11/1989 | Harpell et al. | 428/113 |
| 4,916,000 A | 4/1990 | Li et al. | 428/105 |
| 4,953,234 A | 9/1990 | Li et al. | 2/412 |
| 5,006,390 A | 4/1991 | Kavesh et al. | 428/105 |
| 5,061,545 A | 10/1991 | Li et al. | 428/195 |
| 5,112,667 A | 5/1992 | Li et al. | 428/113 |
| 5,124,195 A | 6/1992 | Harpell et al. | 428/152 |
| 5,165,989 A | 11/1992 | Bhatnagar et al. | 428/245 |
| 5,167,876 A | 12/1992 | Lem et al. | 252/602 |
| 5,175,040 A | 12/1992 | Harpell et al. | 428/113 |
| 5,185,195 A | 2/1993 | Harpell et al. | 428/102 |
| 5,187,023 A | 2/1993 | Prevorsek et al. | 442/228 |
| 5,190,802 A | 3/1993 | Pilato | 428/111 |
| 5,196,252 A | 3/1993 | Harpell et al. | 428/102 |
| 5,330,820 A | 7/1994 | Li et al. | 428/105 |
| 5,471,906 A | 12/1995 | Bachner, Jr. et al. | 89/36.05 |
| 5,503,879 A * | 4/1996 | Cochran | 427/389.9 |
| 5,552,208 A | 9/1996 | Lin et al. | 428/113 |
| 5,587,230 A | 12/1996 | Lin et al. | 428/245 |
| 5,674,969 A | 10/1997 | Sikkema et al. | 528/183 |
| 5,677,029 A | 10/1997 | Prevorsek et al. | 428/113 |
| 5,690,526 A | 11/1997 | Lin et al. | 442/59 |
| 5,702,657 A | 12/1997 | Yoshida et al. | 264/112 |
| 5,939,553 A | 8/1999 | Reichwein et al. | 546/250 |
| 6,040,478 A | 3/2000 | Sikkema et al. | 562/424 |
| 6,119,575 A * | 9/2000 | Dragone et al. | 89/36.05 |
| 6,219,842 B1 | 4/2001 | Bachner, Jr. | 2/2.5 |
| 6,238,768 B1 | 5/2001 | Van de Goot | 428/113 |
| 6,248,676 B1 | 6/2001 | Dischler | 442/217 |
| 6,268,301 B1 | 7/2001 | Dalman et al. | 442/101 |
| 2002/0034624 A1* | 3/2002 | Harpell et al. | 428/298.1 |
| 2003/0199215 A1* | 10/2003 | Bhatnagar et al. | 442/135 |
| 2004/0092183 A1 | 5/2004 | Geva et al. | 442/134 |

FOREIGN PATENT DOCUMENTS

| | | |
|---|---|---|
| WO | WO0029468 | 5/2000 |
| WO | WO 02/101319 | 12/2002 |

OTHER PUBLICATIONS

Wilde et al, Anthony F. "Synthesis and Ballistic Evaluation of Selected Transparent Polyurethane Block Copolymers", National Technical Information Service, U.S. Department of Commerce, Dec. 1973.*

* cited by examiner

FLEXIBLE BALLISTIC COMPOSITES RESISTANT TO LIQUID PICK-UP METHOD FOR MANUFACTURE AND ARTICLES MADE THEREFROM

BACKGROUND OF THE INVENTION

1. Field of the Invention

This invention relates to flexible ballistic composites that have improved resistance to pick up of water and other liquids, a method for their manufacture and articles, such as body armor, made therefrom.

2. Description of the Related Art

Ballistic resistant products for vests and the like are known in the art. Many of these products are based on high tenacity fibers, such as extended chain polyethylene fibers and aramid fibers. Body armor, such as bullet-resistant vests, may be formed from rigid composites and/or flexible composites.

Rigid body armor provides good ballistic resistance, but is also very stiff and relatively bulky. As a result, in general, rigid body armor garments (e.g., vests) are usually less comfortable to wear than flexible body armor garments. Rigid body armor is also referred to as "hard" armor, which has been defined in the art (see, for example, U.S. Pat. No. 5,690,526) to mean an article, such as a helmet or panels for military vehicles, which has sufficient mechanical strength so that it maintains structural rigidity when subjected to a significant amount of stress and is capable of being free-standing without collapsing. In contrast to such rigid or hard armor, is flexible or "soft" armor which does not have the attributes associated with the hard armor previously mentioned. Although flexible body armor based on high tenacity fibers has excellent service experience, its resistance to pick-up of water and other liquids may be less than desired, depending on the type of fibers present. That is, such armor tends to pick up more water (or other liquid) than desired after being brought in contact with or submersed in water (or the other liquid).

U.S. Pat. No. 5,690,526 and PCT publication WO0029468 are directed to rigid body armor and components thereof which incorporate a polyurethane resin, but there is no disclosure of improved resistance to pick-up of water and other liquids.

It would be desirable to provide a flexible ballistic composite material which has improved resistance to pick-up of water and other liquids, while retaining its desirable ballistic and other properties. It would also be desirable to provide a armor, such as body armor, based on such a material which likewise has improved resistance to pick-up of water and other liquids. Such armor desirably would be comfortable to wear and not costly to manufacture.

SUMMARY OF THE INVENTION

In accordance with this invention, there is provided a flexible ballistic resistant composite material that has improved resistance to pick-up of water and other liquids, the composite material comprising a plurality of non-woven fibrous layers, the fibrous layers comprising a network of high tenacity fibers selected from the group consisting of aramid fibers, extended chain polyethylene fibers, rigid rod fibers and blends thereof, the fibers being in a matrix comprising a thermoplastic polyurethane resin.

Also in accordance with this invention, there is provided a flexible ballistic resistant composite material that has improved resistance to pick-up of water and other liquids, the composite material comprising a plurality of non-woven fibrous layers, the fibrous layers comprising a network of high tenacity fibers selected from the group consisting of aramid fibers, extended chain polyethylene fibers, rigid rod fibers and blends thereof, the fibers being in a matrix comprising a thermoplastic polyurethane resin, at least two adjacent fiber layers being oriented in a cross-ply arrangement with respect to each other.

Further in accordance with this invention, there is provided a flexible ballistic resistant armor that has improved resistance to pick-up of water and other liquids, comprising at least one flexible composite material, the composite material comprising a plurality of non-woven fibrous layers, the fibrous layers comprising a network of high tenacity fibers selected from the group consisting of aramid fibers, extended chain polyethylene fibers, rigid rod fibers and blends thereof, the fibers being in a matrix comprising a thermoplastic polyurethane resin.

Additionally, in accordance with this invention, there is provided a flexible ballistic resistant armor that has improved resistance to pick-up of water and other liquids, comprising at least one flexible composite material, the composite material comprising a plurality of non-woven fibrous layers, the fibrous layers comprising a network of high tenacity fibers selected from the group consisting of aramid fibers, extended chain polyethylene fibers, rigid rod fibers and blends thereof, the fibers being in a matrix comprising a thermoplastic polyurethane resin, at least two adjacent fiber layers being oriented in a cross-ply arrangement with respect to each other.

This invention further provides a method for the manufacture of a flexible ballistic resistant composite material that has improved resistance to pick-up of water and other liquids, the method comprising providing a first non-woven fibrous layer comprising a network of high tenacity fibers selected from the group consisting of aramid fibers, extended chain polyethylene fibers, rigid rod fibers and blends thereof; coating the first fibrous layer with a thermoplastic polyurethane resin; providing a second non-woven fibrous layer comprising a network of high tenacity fibers selected from the group consisting of aramid fibers, extended chain polyethylene fibers, rigid rod fibers and blends thereof, coating the second fibrous layer with a thermoplastic polyurethane resin; and consolidating the first and second fibrous layers to form a composite material.

This invention also provides a method of improving the resistance to pick-up of water and other liquids of a flexible ballistic resistant composite material, the composite material comprising a plurality of non-woven fibrous layers, the fibrous layers comprising a network of high tenacity fibers, the method comprising coating the network of high tenacity fibers with a thermoplastic polyurethane resin such that the resin forms a matrix for said fibers, and wherein the fibers are selected from the group consisting of aramid fibers, extended chain polyethylene fibers, rigid rod fibers and blends thereof.

This invention further provides a method of improving the resistance to pick-up of water and other liquids of a flexible ballistic resistant armor article, the armor article comprising at least one composite material, the composite material comprising a plurality of non-woven fibrous layers, the fibrous layers comprising a network of high tenacity fibers, the method comprising coating the network of high tenacity fibers with a thermoplastic polyurethane resin such that the resin forms a matrix for the fibers, and forming the flexible armor at least in part from the at least one composite material, wherein the fibers are selected from the group consisting of aramid fibers, extended chain polyethylene fibers, rigid rod fibers and blends thereof.

The flexible composite materials may also comprise flexible films on one or both sides of each fibrous layer and the adjacent layers of the composite material may be arranged such that the directions of the fibers in adjacent layers are rotated about 90°, or other desired orientation, to one another.

The present invention provides a composite material which is flexible and has improved resistance to liquid pick-up while retaining its desirable ballistic resistant properties. Likewise, the present invention provides flexible armor, such as body armor, which has improved resistance to liquid pick-up while also retaining its desirable ballistic resistant properties and comfort. The composite material and armor made therefrom can be made on existing equipment in a cost-effective manner.

DETAILED DESCRIPTION OF THE INVENTION

Figure 1:
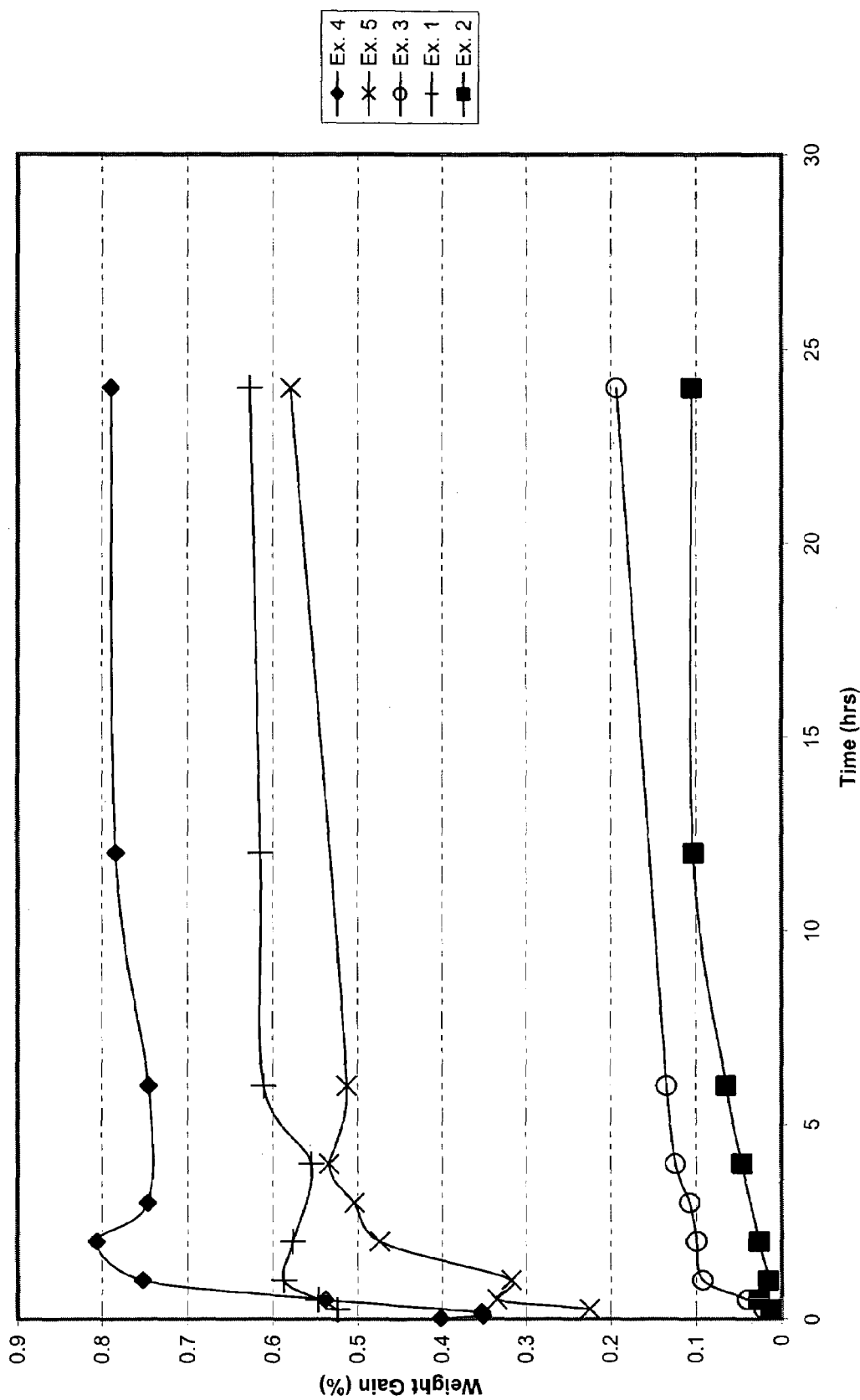
FIG. 1 is a graph of weight gain versus water submersion time for single composite materials, including those of the invention.

The present invention comprises a soft, flexible composite which is ballistic resistant and has improved resistance to pick up of water and other liquids. Such other liquids include, without limitation, gasoline and other petroleum products, oils and lubricants. These composites are particularly useful in ballistic resistant flexible armor articles, such as body armor, blankets and the like.

As mentioned above, the flexible armor of this invention is in contrast to rigid or hard armor. The flexible materials and armor of this invention do not retain their shape when subjected to a significant amount of stress and are incapable of being free-standing without collapsing.

The composite comprises high tenacity fibers that are in a thermoplastic polyurethane resin matrix. The composite is formed from at least two layers of the high tenacity fibers. For the purposes of the present invention, a fiber is an elongate body the length dimension of which is much greater that the transverse dimensions of width and thickness. Accordingly, the term fiber includes monofilament, multifilament, ribbon, strip, staple and other forms of chopped, cut or discontinuous fiber and the like having regular or irregular cross-section. The term "fiber" includes a plurality of any of the foregoing or a combination thereof. A yarn is a continuous strand comprised of many fibers or filaments.

The cross-sections of fibers useful in this invention may vary widely. They may be circular, flat or oblong in cross-section. They also may be of irregular or regular multi-lobal cross-section having one or more regular or irregular lobes projecting from the linear or longitudinal axis of the filament. It is particularly preferred that the fibers be of substantially circular, flat or oblong cross-section, most preferably that the fibers be of substantially circular cross-section.

As used herein, the term "high tenacity fibers" means fibers which have tenacity equal to or greater than about 7 g/d. These fibers preferably have initial tensile moduli of at least about 150 g/d and energies-to-break of at least about 8 J/g as measured by ASTM D2256. Preferred fibers are those having a tenacity equal to or greater than about 10 g/d, a tensile modulus equal to or greater than about 200 g/d and an energy-to-break equal to or greater than about 20 J/g. Particularly preferred fibers are those having a tenacity equal to or greater than about 16 g/d, a tensile modulus equal to or greater than about 400 g/d, and an energy-to-break equal to or greater than about 27 J/g. Amongst these particularly preferred embodiments, most preferred are those embodiments in which the tenacity of the fibers is equal to or greater than about 22 g/d, the tensile modulus is equal to or greater than about 500 g/d, and the energy-to-break is equal to or greater than about 27 J/g. As used herein, the terms "initial tensile modulus", "tensile modulus" and "modulus" mean the modulus of elasticity as measured by ASTM 2256 for a yarn and by ASTM D638 for a matrix material.

The network of fibers used in the composite of the present invention is in the form of a non-woven fabric formed from the high tenacity fibers. A particularly preferred configuration of the fibers is in a network wherein the fibers are unidirectionally aligned so that they are substantially parallel to each other along a common fiber direction. Preferably, at least about 50% by weight of the fibers in the non-woven fabric are high tenacity fibers, and more preferably at least about 75% by weight of the fibers in the fabric are high tenacity fibers.

The yarns and fabrics of the invention may be comprised of one or more different high strength fibers. The yarns may be in essentially parallel alignment, or the yarns may be twisted, over-wrapped or entangled.

High strength fibers useful in the yarns and fabrics of the invention are highly oriented high molecular weight high modulus polyethylene fibers (also known as extended chain polyethylene), aramid fibers, and rigid rod polymers. Blends of two or more different fibers may also be utilized. Most preferred are aramid fibers.

The fibers may be of any suitable denier, such as, for example, about 50 to about 3000 denier, more preferably from about 200 to about 3000 denier, still more preferably from about 650 to about 1500 denier, and most preferably from about 800 to about 1300 denier.

U.S. Pat. No. 4,457,985 generally discusses such high molecular weight polyethylene fibers, and the disclosure of this patent is hereby incorporated by reference to the extent that it is not inconsistent herewith. In the case of polyethylene, suitable fibers are those of weight average molecular weight of at least about 150,000, preferably at least about one million and more preferably between about two million and about five million. Such high molecular weight polyethylene fibers may be spun in solution (see U.S. Pat. No. 4,137,394 and U.S. Pat. No. 4,356,138), or a filament spun from a solution to form a gel structure (see U.S. Pat. No. 4,413,110, German Off. No. 3,004,699 and GB Patent No. 2051667), or the polyethylene fibers may be produced by a rolling and drawing process (see U.S. Pat. No. 5,702,657). As used herein, the term polyethylene means a predominantly linear polyethylene material that may contain minor amounts of chain branching or comonomers not exceeding 5 modifying units per 100 main chain carbon atoms, and that may also contain admixed therewith not more than about 50 wt % of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as antioxidants, lubricants, ultraviolet screening agents, colorants and the like which are commonly incorporated.

High tenacity polyethylene fibers useful herein are sold under the trademark SPECTRA® by Honeywell International Inc. of Morristown, N.J., USA.

Depending upon the formation technique, the draw ratio and temperatures, and other conditions, a variety of properties can be imparted to these fibers. The tenacity of the fibers is at least about 7 g/d, preferably at least about 15 g/d, more preferably at least about 20 g/d, still more preferably at least about 25 g/d and most preferably at least about 30 g/d. Similarly, the initial tensile modulus of the fibers, as measured by an Instron tensile testing machine, is preferably at least about 300 g/d, more preferably at least about 500 g/d, still more preferably at least about 1,000 g/d and most preferably at least about 1,200 g/d. These highest values for initial tensile modulus and tenacity are generally obtainable only by employing solution grown or gel spinning processes. Many of the filaments have melting points higher than the melting point of the polymer from which they were formed. Thus, for example, high molecular weight polyethylene of about 150,000, about one million and about two million molecular weight generally have melting points in the bulk of 138° C. The highly oriented polyethylene filaments made of these materials have melting points of from about 7° C. to about 13° C. higher. Thus, a slight increase in melting point reflects the crystalline perfection and higher crystalline orientation of the filaments as compared to the bulk polymer.

In the case of aramid fibers, suitable fibers formed from aromatic polyamides are described in U.S. Pat. No. 3,671,542, which is incorporated herein by reference to the extent not inconsistent herewith. Preferred aramid fibers will have a tenacity of at least about 20 g/d, an initial tensile modulus of at least about 400 g/d and an energy-to-break at least about 8 J/g, and particularly preferred aramid fibers will have a tenacity of at least about 20 g/d and an energy-to-break of at least about 20 J/g. Most preferred aramid fibers will have a tenacity of at least about 23 g/d, a modulus of at least about 500 g/d and an energy-to-break of at least about 30 J/g. For example, poly(p-phenylene terephthalamide) filaments which have moderately high moduli and tenacity values are particularly useful in forming ballistic resistant composites. Examples are Twaron® T2000 from Teijin which has a denier of 1000. Other examples are Kevlar® 29 which has 500 g/d and 22 g/d and Kevlar® 49 which has 1000 g/d and 22 g/d as values of initial tensile modulus and tenacity, respectively, both available from du Pont. Copolymers of poly(p-phenylene terephthalamide) may also be used, such as co-poly(p-phenylene terephthalamide 3,4' oxydiphenylene terephthalamide). Also useful in the practice of this invention are poly(m-phenylene isophthalamide) fibers produced commercially by du Pont under the trade name Nomex®.

Rigid rod fibers are disclosed, for example, in U.S. Pat. Nos. 5,674,969, 5,939,553, 5,945,537 and 6,040,478, the disclosures of which are incorporated herein by reference to the extent not inconsistent herewith. Such fibers are available under the designation M5® fibers from Magellan Systems International.

The high strength fabric is in the form of a non-woven fabric, such as plies of unidirectionally oriented fibers, or fibers which are felted in a random orientation and which are embedded in a suitable resin matrix. Fabrics formed from unidirectionally oriented fibers typically have one layer of fibers which extends in one direction and a second layer of fibers which extends in a direction 900 from the fibers in the first layer. Where the individual plies are unidirectionally oriented fibers, the successive plies are preferably rotated relative to one another, for example at angles of 0°/90° or 0°/45°/90°/45°/0° or at other angles.

It is convenient to characterize the geometries of the composites of the invention by the geometries of the fibers. One such suitable arrangement is a fibrous layer in which the fibers are aligned parallel to one another along a common fiber direction (referred to as a "unidirectionally aligned fiber network"). Successive layers of such unidirectionally aligned fibers can be rotated with respect to the previous layer. Preferably, the fibrous layers of the composite are cross-plied, that is, with the fiber direction of the unidirectional fibers of each network layer rotated with respect to the fiber direction of the unidirectional fibers of the adjacent layers. An example is a five layer article with the second, third, fourth and fifth layers rotated +45°, −45°, 90° and 0° with respect to the first layer. A preferred example includes two layers with a 0°/90° layup. Such rotated unidirectional alignments are described, for example, in U.S. Pat. Nos. 4,457,985; 4,748,064; 4,916,000; 4,403,012; 4,623,574; and 4,737,402.

In general, the fibrous layers of the invention are preferably formed by constructing a fiber network initially and then coating the network with the matrix composition. As used herein, the term "coating" is used in a broad sense to describe a fiber network wherein the individual fibers either have a continuous layer of the matrix composition surrounding the fibers or a discontinuous layer of the matrix composition on the surfaced of the fibers. In the formed case, it can be said that the fibers are fully embedded in the matrix composition. The terms coating and impregnating are interchangeably used herein. The fiber networks can be constructed via a variety of methods. In the preferred case of unidirectionally aligned fiber networks, yarn bundles of the high tenacity filaments are supplied from a creel and led through guides and one or more spreader bars into a collimating comb prior to coating with the matrix material. The collimating comb aligns the filaments coplanarly and in a substantially unidirectional fashion.

The method of this invention includes initially forming the fiber network layer, preferably a unidirectional network as described above, applying a solution, dispersion or emulsion of the matrix composition onto the fiber network layer, and then drying the matrix-coated fiber network layer. The solution, dispersion or emulsion is preferably an aqueous solution of the polyurethane resin, which may be sprayed onto the filaments. Alternatively, the filament structure may be coated with the aqueous solution, dispersion or emulsion by dipping or by means of a roll coater or the like. After coating, the coated fibrous layer may then be passed through an oven for drying in which the coated fiber network layer (unitape) is subjected to sufficient heat to evaporate the water in the matrix composition. The coated fibrous network may then be placed on a carrier web, which can be a paper or a film substrate, or the fibers may initially be placed on a carrier web before coating with the matrix resin. The substrate and the consolidated unitape can then be wound into a continuous roll in a known manner.

The consolidated unitape can be cut into discrete sheets and laid up into a stack for formation into the end use composite. As mentioned previously, the most preferred composite is one wherein the fiber network of each layer is unidirectionally aligned and oriented so that the fiber directions in successive layers are in a 0°/90° orientation.

The fibers in each adjacent layer may be the same or different, although it is preferred that the fibers in each two adjacent layers of the composite be the same.

The resin matrix for the fibers in the fibrous layers is a thermoplastic polyurethane resin. The polyurethane resin may be a homopolymer or copolymer, and blends of one or more of these resins may also be employed herein. Such resins are known in the art and are commercially available. Preferably, such resins are provided in an aqueous system for ease of use. These resins are typically available as aqueous solutions, dispersions or emulsions, in which the solids component may range from about 20 to about 80 percent by weight, more preferably from about 40 to about 60 percent by weight, with the remaining weight being water. Conventional additives, such as fillers and the like, may be included in the resin composition.

The proportion of the resin matrix material to fiber in the composite layers may vary widely depending upon the end use. The polyurethane resin, on a solids basis, preferably forms about 1 to about 40 percent by weight, more preferably from about 10 to about 30 percent by weight, and most preferably from about 15 to about 28 percent by weight, of each composite layer.

The composite materials of this invention may be formed from individual laminae by consolidating under heat and pressure, such as, for example, at temperatures ranging from about 75 to about 260° F. (24 to 127° C.), pressures of from about 1 to about 250 psi (6.9 to 1725 kPa) and for a time of from about 1 to about 30 minutes.

The number of layers in the composite material depends on the particular end use. Most preferably, each composite is formed from two fibrous layers which are oriented 90° with respect to each other and have been consolidated into a single structure. In an alternate embodiment, the composite may be formed from two sets of such single structures, such that a total of four layers of fibers are employed; in this case, two of the two-ply consolidated structures are consolidated with one another.

The number of layers of composite used in articles formed therefrom vary depending upon the ultimate use of the article. Preferably, the composites of this invention form the outer facing layers of the body armor, such as a vest, but alternatively they may form the inner layers. For example, in body armor vests for military applications, in order to achieve a desired 1.0 pound per square foot areal density (4.9 kg/m$^2$), in one typical construction there may be 22 layers. Not all of these need be formed from the composites of this invention. For example, a vest may be formed from 11 layers of the two-layer structure that has been consolidated together in a 90° orientation, which 11 layers need not be bonded to each other. In such an embodiment, there may be 11 additional layers used to form the bottom layers of the vest material; these layers may be woven, knitted or non-woven fabrics and preferably also formed from high tenacity fibers, and more preferably formed from the same group of fibers as are in the non-woven layers.

In another embodiment, body armor vests for law enforcement end use may have a number of layers based on the National Institute of Justice (NIJ) Threat Level. For example, for an NIJ Threat Level IIIA vest, there may also be a total of 22 layers. As above, not all layers need be formed from the composite material of this invention. In such embodiment, the top 11 layers may be formed from the composite material of this invention, and the bottom 11 layers may be formed from woven, knitted or non-woven fabrics, and preferably are also formed from high tenacity fibers, and more preferably formed from the same group of fibers as are in the non-woven layers. For a lower NIJ Threat Level, there may be employed fewer layers of the various materials.

In one embodiment of this invention, body armor vests are formed from a plurality of layers of a non-woven composite formed from aramid fibers, in combination with a plurality of layers of a composite material formed from a woven aramid fabric that has been coated with a matrix material other than a thermoplastic polyurethane resin.

As noted above, the high tenacity fibers of each layer are coated with the matrix composition and then the matrix composition/fibers combination is consolidated. By "consolidating" is meant that the matrix material and the fibrous layer are combined into a single unitary layer. Consolidation can occur via drying, cooling, heating, pressure or a combination thereof.

One or more plastic films can be included in the composite to permit different composite layers to slide over each other for ease of forming into a body shape and ease of wearing. These plastic films may typically be adhered to one or both surfaces of each composite. Any suitable plastic film may be employed, such as films made of polyolefins. Examples of such films are linear low density polyethylene (LLDPE) films, ultrahigh molecular weight polyethylene (UHMWPE) films, polyester films, nylon films, polycarbonate films and the like. These films may be of any desirable thickness. Typical thicknesses range from about 0.1 to about 1.2 mils (2.5 to 30 μm), more preferably from about 0.2 to about 1 mil (5 to 25 μm), and most preferably from about 0.3 to about 0.5 mils (7.5 to 12.5 μm). Most preferred are films of LLDPE.

Various constructions are known for fiber-reinforced composites used in impact and ballistic resistant articles. These composites display varying degrees of resistance to penetration by high speed impact from projectiles such as bullets, shrapnel and fragments, and the like. For example, U.S. Pat. Nos. 6,268,301 B1, 6,248,676 B1, 6,219,842 B1; 5,677,029, 5,587,230; 5,552,208; 5,471,906; 5,330,820; 5,196,252; 5,190,802; 5,187,023; 5,185,195; 5,175,040; 5,167,876; 5,165,989; 5,124,195; 5,112,667; 5,061,545; 5,006,390; 4,953,234; 4,916,000; 4,883,700; 4,820,568; 4,748,064; 4,737,402; 4,737,401; 4,681,792; 4,650,710; 4,623,574; 4,613,535; 4,584,347; 4,563,392; 4,543,286; 4,501,856; 4,457,985; and 4,403,012; PCT Publication No. WO 91/12136; and a 1984 publication of E.I. DuPont De Nemours International S.A. entitled "Lightweight Composite Hard Armor Non Apparel Systems with T-963 3300 dtex DuPont Kevlar 29 Fibre", all describe ballistic resistant composites which include high strength fibers made from high molecular weight polyethylene and aramids.

In one embodiment of the invention, a vest or other body armor or other article is formed in a conventional manner from a plurality of layers of the composite material. These layers preferably are not laminated together but may be stitched together to avoid slippage of the individual plies with respect to each other. For example, the layers may be tack stitched at each corner. Alternatively, the layers may be encased as a whole in a pocket or other covering.

As mentioned above, the composite material of this invention has improved resistance to pick-up of water. It also has improved resistance to pick-up of other liquids, such as gasoline, petroleum, oils and lubricants.

The flexible ballistic armor of this invention preferably is characterized in having a V50 of at least about 1920 fps (585.6 mps) when impacted with a 16 grain projectile, after the armor has been submersed in sea water for 24 hours at 70° F.±5° F. (21° C.±2.8° C.). The flexible ballistic armor of this invention is also preferably characterized in retaining at least about 85%, more preferably at least about 90%, of its V50 performance after immersion in tap water at 70° F.±5° F. (21° C.±2.8° C.) for 20 hours, when impacted with a 17 grain fragment simulated projectile; under these conditions, the flexible ballistic armor also exhibits a weight increase of preferably not more than about 50%, and more preferably not more than about 40% from its dry weight.

Moreover, the flexible ballistic armor of this invention preferably is characterized in retaining at least about 85%, more preferably at least about 90%, of its V50 performance after immersion in gasoline at 70° F.±5° F. (21° C.±2.8° C.) for 4 hours, when impacted with a 16 grain projectile.

The following non-limiting examples are presented to provide a more complete understanding of the invention. The specific techniques, conditions, materials, proportions and reported data set forth to illustrate the principles of the invention are exemplary and should not be construed as limiting the scope of the invention. All percentages are by weight, unless otherwise stated.

EXAMPLES

Example 1

A four-ply non-woven composite was formed from layers of aramid fiber (Twaron® T2000 from Teijin, having a denier of 1000 and a tenacity of 26 g/d). Unitapes of aramid fibers were prepared by passing the fibers from a creel and through a combing station to form a unidirectional network. The fiber network was then placed on a carrier web and the matrix resin is coated thereon. The matrix resin was a dispersion of a thermoplastic polyurethane resin (described by its manufacturer as being a copolymer mix of polyurethane resins in water (40-60% resin), having a relative density of 1.05 g/cc at 23° C. and a viscosity of 40 cps at 23° C.). The coated fiber network was then passed through an oven to evaporate the water in the composition and was wound up on a roller, with the carrier web stripped therefrom, in preparation for forming the composite material. The resulting structure contained 16 weight percent of the polyurethane resin. Two continuous rolls of unidirectional fiber prepregs were prepared in this manner. Two such unitapes were cross-plied at 90° and consolidated under heat and pressure to create a laminate with two identical aramid fiber laminae. Two such two-ply consolidated structures were then cross-plied once again at 90°, and consolidated under heat and pressure. The resulting structure was a 4-ply aramid composite. Samples of this material measuring 18×18 in. (45.7×45.7 cm) were used in the following test. Unless otherwise indicated the test samples in all of the following examples were the same size as the samples in Example 1.

The water pick-up resistance of the 4-ply composite structure was determined as follows. The composite was immersed in a container of tap water at room temperature (70° F., 21° C.) for an indicated time, after which the composite was hung vertically for 15 minutes to drip dry. The weight of the wet composite was compared to that of the dry composite to determine the weight gain. The results are shown in FIG. 1 (as curve labeled Ex. 1).

It can be seen that the weight gain increases to about 52% after about 4 hours, and then levels off for the duration of the 24-hour test.

Example 2

Example 1 was repeated, except that each two-ply aramid composite was first formed with a 0.35 mil (8.89 μm) linear low density polyethylene (LLDPE) film on one surface. Two of these composites were consolidated in a press, with the aramid layers facing each other. The result was a 4-ply aramid structure with polyethylene films on each outer surface.

The water resistance of this four-ply composite was tested as in Example 1, and the results are also shown in FIG. 1 (as curve labeled Ex. 2).

It can be seen that the weight gain for this structure is very minimal, being about 10% after 24 hours. In addition, the weight gain levels off after about 12 hours.

Example 3

Example 1 was repeated using only the two ply unitape of aramid fibers.

The water resistance of the two-ply composite was tested as in Example 1, and the results are also shown in FIG. 1 (as curve labeled Ex. 3).

It can be seen that the weight gain for this structure is very minimal, with a weight gain after 24 hours of about 20%.

Example 4

Comparative

Example 1 is repeated, except that the resin matrix was an elastomer (Kraton® D1107 isoprene-styrene-isoprene block copolymer available from Kraton Polymer LLC). The amount of the resin in the composite was 16% by weight. Each 2-ply aramid laminate was consolidated with a 0.35 mil (8.9 μm) film of LLDPE. A 4-ply laminate was formed by consolidating two 2-ply laminates (aramid to aramid), with the polyethylene films on the outer surfaces. The water resistance of this structure was tested as in Example 1, and the results are also shown in FIG. 1 (as curve labeled Ex. 4).

It can be seen that this composite material shows an 80% weight gain after about 2 hours, and the weight gain remains about the same throughout the 24-hour test. As compared with Example 1, the weight gain is appreciably more.

Example 5

Comparative

Example 3 is repeated, except that the resin matrix was the same as in Example 4. In addition, LLPDE films were attached on both sides of the two plies of the aramid fabric layers. The water resistance of this two-ply structure was tested as in Example 1, and the results are also shown in FIG. 1 (as curve labeled Ex. 5).

It can be seen that this composite material shows a 60% increase in weight gain after only about 1 hour, and the weight gain remains approximately the same for the duration of the 24-hour test. As compared with Example 3, the weight gain is appreciably more.

Example 6

Figure 2:
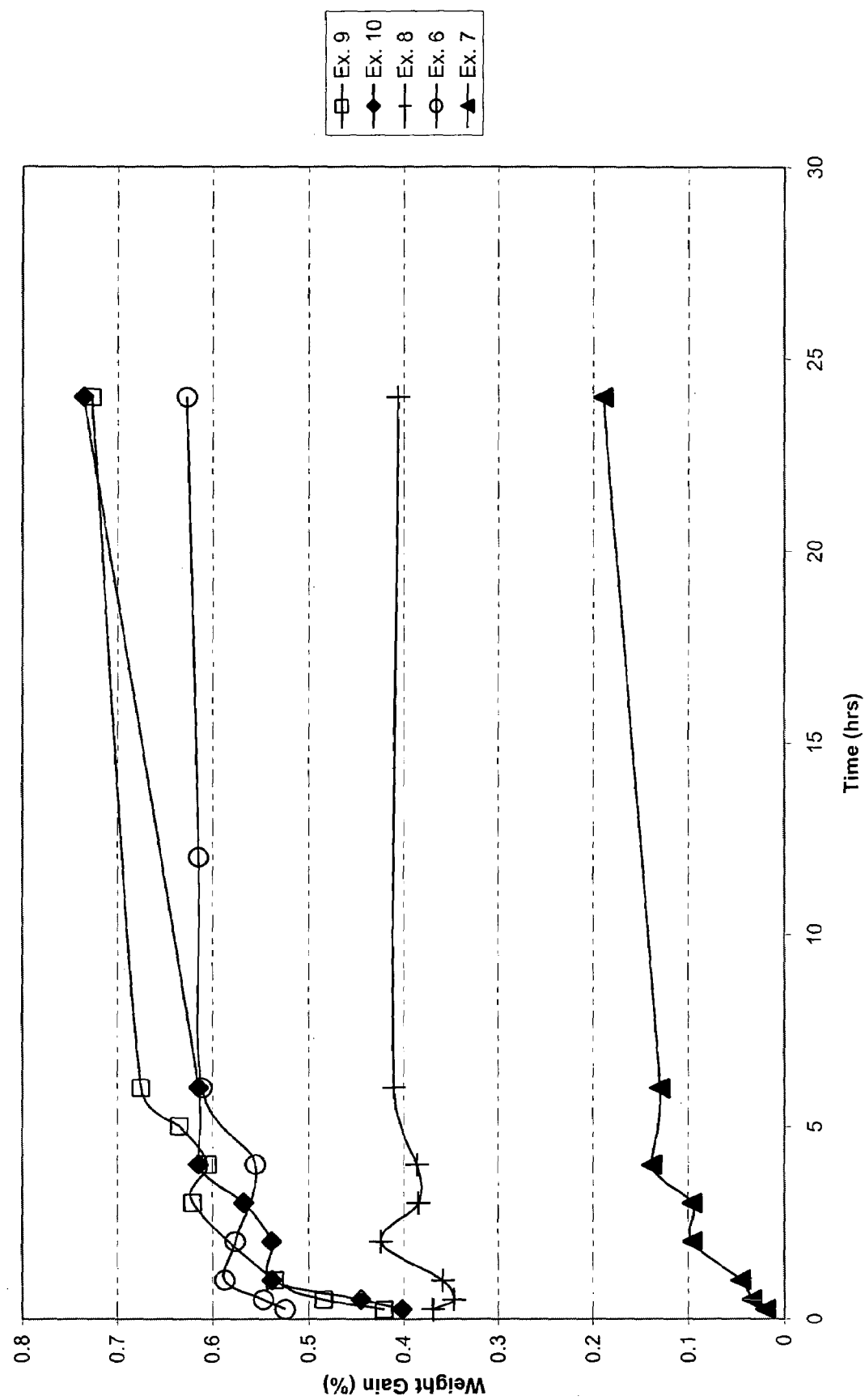
FIG. 2 is a graph of weight gain versus water submersion time for 11 layers of composite materials, including those of the invention.

In this example, 11 layers of the four-ply composite of Example 1 were formed together (tack stitched at each corner) and were tested for weight gain as in Example 1, with the 11 layer package allowed to drip dry for the same period of time. The results are shown in FIG. 2 (as curve labeled Ex. 6).

It can be seen that the weight gain is about 62% after 24 hours, which remained about the same after the first hour.

Example 7

Example 6 were repeated, but with 11 layers of the four-ply composite of Example 2. The structure was tested for weight gain as in Example 6, and the results are shown in FIG. 2 (as curve labeled Ex. 7).

It can be seen that the weight gain for this structure is only about 19% at the end of the 24-hour test.

Example 8

Example 6 was repeated, but with 11 layers of the two-ply composite of Example 3. The structure was tested for weight gain as in Example 6, and the results are shown in FIG. 2 (as curve labeled Ex. 8).

It can be seen that the weight gain for this structure is about 40%, from the beginning to the end of the test.

Example 9

Comparative

Example 6 was repeated, but with 11 layers of the four-ply composite of Comparative Example 4. The structure was tested for weight gain as in Example 6, and the results are shown in FIG. 2 (as curve labeled Ex. 9).

It can be seen that this composite material has a weight gain of about 72% after 24 hours, compared with a weight gain of about 62% in Example 6. Also, whereas the weight gain curve of Example 6 is essentially flat, it is rising in Comparative Example 9.

Example 10

Comparative

Example 6 was repeated, but with 11 layers of the two-ply composite of Comparative Example 5. The structure was tested for weight gain as in Example 6, and the results are shown in FIG. 2 (as curve labeled Ex. 10).

It can be seen that this composite material has a weight gain of about 72% after 24 hours, compared with a weight gain of only about 40% for the two-ply composite of Example 8. Also, whereas the weight gain curve of Example 8 is essentially flat, it is rising in Comparative Example 10.

Examples 11 and 12

The ballistic characteristics of multiple layers (shoot pack) of the 4-ply composite of Example 1 were determined before and after 20 hours of soaking in tap water at 70° F. (21° C.). The fragment was as specified by MIL-P-46593A (ORD), caliber=0.22, 17 grain Fragment Simulating Projectile (FSP). The test method followed the guidelines of MIL-STD-662F. Several 17 grain FSP were fired on a shoot pack of 23 layers of the 4-ply laminate of Example 1, each measuring 18×18 inches (45.7×45.7 cm), which were stitched only at the corners to hold the layers together. The shoot pack was clamped only at the top, and the lower part of the shoot pack was partially restrained by 1.5 inch (3.8 cm) wide steel angles clamped on the edges.

The V50 calculation was determined based on the average of 6 pairs of fragments stopped on the shoot pack and penetrated the shoot pack. V50 velocity is that velocity for which the projectile has a 50% probability of penetration. The maximum velocity spread allowed is 125 fps (38.1 mps).

The results are shown in Table 1, below. It can be seen that even after 20 hours of soaking the shoot pack containing the composites of this invention retained 85% of their ballistic performance characteristics in accordance with this test.

TABLE 1

| Example | Condition | Weight, psf (kg/m$^2$) | Weight Increase (%) | 17 Grain FSP V50, fps (mps) | Performance Retention (%) |
|---|---|---|---|---|---|
| 11 | Control | 1.04 (5.10) | Control | 1864 (568.5) | Control |
| 12 | Wet | 1.46 (7.15) | 40 | 1590 (485.0) | 85 |

Examples 13 and 14

The ballistic characteristics of 48 layers of the 2-ply composite of Example 3 were determined before and after 24 hours of soaking in tap water, in the same manner as with Examples 11 and 12.

The results are shown in Table 2, below. It can be seen that even after 24 hours of soaking the shoot pack containing the composites of this invention retained 92% of their ballistic performance characteristics in accordance with this test.

TABLE 2

| Example | Condition | Weight, psf (kg/m$^2$) | Weight Increase (%) | 17 Grain FSP V50, fps (mps) | Performance Retention (%) |
|---|---|---|---|---|---|
| 13 | Control | 1.04 (5.10) | Control | 1887 (575.5) | Control |
| 14 | Wet | 1.46 (7.16) | 40 | 1727 (526.7) | 92 |

Examples 15 and 16

The ballistic characteristics of 24 layers of the 4-ply composite of Example 1 were determined before and after 4 hours of soaking in gasoline at room temperature (70° F., 21° C.). Ballistic tests were conducted as in Examples 11 and 12, but with 16 grain, right circular cylinder (RCC) test sample fragments as used by the U.S. Army.

The results are shown in Table 3, below. As shown in Table 3, the composite of this invention only increased in weight by 13% after 4 hours soaking in gasoline, indicating a minimal pick-up of the liquid. Also, it can be seen that even after 4 hours of soaking in gasoline the shoot pack containing the composites of this invention retained 89% of their ballistic performance characteristics in accordance with this test.

TABLE 3

| Example | Condition | Weight, psf (kg/m$^2$) | Weight Increase (%) | 16 Grain RCC V50, fps (mps) | Performance Retention (%) |
|---|---|---|---|---|---|
| 15 | Control | 0.98 (4.80) | Control | 2103 (641.4) | Control |
| 16 | Wet | 1.11 (5.44) | 13 | 1878 (572.8) | 89 |

Accordingly, it can be seen that the present invention provides a flexible ballistic composite that has improved resistance to pick-up of water and other liquids. Armor, such as vests, made from the composite of the invention is flexible and likewise has improved resistance to pick-up of water and other liquids. The armor still retains its desirable ballistic-resistant properties.

The invention thus provides a method of improving the resistance to pick-up of water and other liquids of a flexible ballistic resistant composite material, wherein the composite material comprises a plurality of non-woven fibrous layers. The fibrous layers comprise a network of high tenacity fibers. The network of high tenacity fibers is coated with a thermoplastic polyurethane resin such that the resin forms a matrix for the fibers. The fibers are aramid fibers, extended chain polyethylene fibers, rigid rod fibers or blends thereof.

This invention also provides a method of improving the resistance to pick-up of water and other liquids of a flexible ballistic resistant armor, such as a body armor, which is formed of at least one composite material. The composite material comprises a plurality of non-woven fibrous layers, with the fibrous layers comprising a network of high tenacity fibers. The network of high tenacity fibers is coated with a thermoplastic polyurethane resin such that the resin forms a matrix for the fibers. The flexible body armor is formed at least in part from the composite material and the fibers are aramid fibers, extended chain polyethylene fibers, rigid rod fibers or blends thereof.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. A flexible ballistic resistant body armor vest that has improved resistance to pick-up of water and other liquids, said flexible armor being incapable of free-standing without collapsing, said vest comprising (i) a plurality of layers of a flexible composite material, said flexible composite material comprising a plurality of non-woven fibrous layers, said non-woven fibrous layers comprising a network of high tenacity aramid fibers unidirectionally arranged and being in a matrix comprising a thermoplastic polyurethane resin, said matrix being applied to said fibrous layers as a copolymer mix of polyurethane resins in water, said matrix resin and said fibers being consolidated into a single unitary layer, and (ii) a plurality of layers of a second composite material formed from an aramid fabric, wherein said armor exhibits at least one of the following properties:
   (a) said armor has a V50 of at least about 1920 fps (585.6 mps) when impacted with a 16 grain projectile, after the armor has been submersed in sea water for 24 hours at 70° F. ±5° F. (21° C.±2.8° C.),
   (b) said armor retains at least about 85% of its V50 performance after immersion in tap water at 70° F.±5° F. (21° C.±2.8° C) for 20 hours, when impacted with a 17 grain fragment simulated projectile, and
   (c) said armor retains at least about 85% of its V50 performance after immersion in gasoline at 70° F.±5° F. (21° C.±2.8° C.) for 4 hours, when impacted with a 16 grain projectile.

2. The flexible ballistic resistant body armor of claim 1, wherein said aramid fabric is a woven fabric.

3. A flexible ballistic resistant body armor vest that has improved resistance to pick-up of water and other liquids, said flexible armor being incapable of free-standing without collapsing, said vest comprising a plurality of layers of a flexible composite material, said flexible composite material comprising a plurality of non-woven fibrous layers, said non-woven fibrous layers comprising a network of high tenacity aramid fibers unidirectionally arranged and being in a matrix comprising a thermoplastic polyurethane resin, said matrix being applied to said fibrous layers as a copolymer mix of polyurethane resins in water, said matrix resin and said fibers being consolidated into a single unitary layer, and a plastic film bonded to an outer facing surface of one of said non-woven fibrous layers, wherein said armor exhibits at least one of the following properties:
   (a) said armor has a V50 of at least about 1920 fps (585.6 mps) when impacted with a 16 grain projectile, after the armor has been submersed in sea water for 24 hours at 70° F.±5° F. (21° C.±2.8° C.), (b) said armor retains at least about 85% of its V50 performance after immersion in tap water at 70° F.±5° F. (21° C.±2.8° C.) for 20 hours, when impacted with a 17 grain fragment simulated projectile, and
   (c) said armor retains at least about 85% of its V50 performance after immersion in gasoline at 70° F.±5° F. (21° C.±2.8° C.) for 4 hours, when impacted with a 16 grain projectile.

4. A flexible ballistic resistant body armor vest that has improved resistance to pick-up of water and other liquids, said flexible armor being incapable of free-standing without collapsing, said vest comprising a plurality of layers of a flexible composite material, said flexible composite material comprising a plurality of non-woven fibrous layers, said non-woven fibrous layers comprising a network of high tenacity aramid fibers unidirectionally arranged and being in a matrix comprising a thermoplastic polyurethane resin, said matrix being applied to said fibrous layers as a copolymer mix of polyurethane resins an water, said matrix resin and said fibers being consolidated into a single unitary layer, wherein said armor exhibits at least one of the following properties:
   (a) said armor has a V50 of at least about 1920 fps (585.6 mps) when impacted with a 16 gain projectile, after the armor has been submersed in sea water for 24 hours at 70° F. ±5° F. (21° C.±2.8° C.),
   (b) said armor retains at least about 85% of its V50 performance after immersion in tap water at 70° F.±5° F. (21° C.±2.8° C.) for 20 hours, when impacted with a 17 grain fragment simulated projectile, and
   (c) said armor retains at least about 85% of its V50 performance after immersion in gasoline at 70° F.±5° F. (21° C.±2.8° C.) for 4 hours, when impacted with a 16 grain projectile.

5. The flexible ballistic resistant body armor of claim 4 wherein said vest further comprises a plurality of layers of a second composite material formed from an aramid fabric.

6. The flexible ballistic resistant body armor of claim 5 wherein said aramid fabric is a woven aramid fabric.

7. The flexible ballistic resistant body armor of claim 5, wherein said second composite material is coated with a second matrix material that is other than a thermoplastic polyurethane resin.

8. The flexible ballistic resistant body armor of claim 4, wherein said thermoplastic polyurethane resin is present in an amount from about 1 to about 40 percent by weight of the total weight of the composite.

9. The flexible ballistic resistant body armor of claim 8, wherein said thermoplastic polyurethane resin is present in an amount from about 10 to about 30 percent by weight of the total weight of the composite.

10. The flexible ballistic resistant body armor of claim 4, wherein said composite material further comprises at least one plastic film bonded to at least one of said non-woven fibrous layers.

11. The flexible ballistic resistant body armor of claim 10, wherein said plastic film comprises a linear low density polyethylene film.

12. The flexible ballistic resistant body armor of claim 4, wherein said composite material comprises four non-woven fibrous layers which are cross-plied with respect to one another.

13. The flexible ballistic resistant body armor of claim 12, further comprising a plastic film bonded to each outermost layer of said non-woven fibrous layers.

14. The flexible ballistic resistant body armor of claim 12, wherein adjacent fiber layers are cross-plied at 90° to each other.

15. The flexible ballistic resistant body armor of claim 4, wherein said composite material comprises two non-woven fibrous layers which are cross-plied with respect to one another.

16. The flexible ballistic resistant body armor of claim 15, further comprising a plastic film bonded to one outermost layer of said non-woven fibrous layers.

17. The flexible ballistic resistant body armor of claim 15, wherein said adjacent fiber layers are cross-plied at 90° to each other.

18. The flexible ballistic resistant body armor of claim 4, wherein said fibers have a denier of from about 200 to about 3000.

19. The flexible ballistic resistant body armor of claim 4, wherein said fibers have a denier of from about 650 to about 1500.

20. The flexible ballistic resistant body armor of claim 4, wherein said armor has a V50 of at least about 1920 fps (585.6 mps) when impacted with a 16 grain projectile, after the armor has been submersed in sea water for 24 hours at 70° F.±5° F. (21° C.±2.8° C.).

21. The flexible ballistic resistant body armor of claim 4, wherein said armor retains at least about 85% of its V50 performance after immersion in tap water at 70° F.±5° F. (21° C.±2.8° C.) for 20 hours, when impacted with a 17 grain fragment simulated projectile.

22. The flexible ballistic resistant body armor of claim 21, wherein said armor exhibits a weight increase of not more than about 50% from its dry weight after immersion in tap water at 70° F.±5° F. (21° ±2.8° C.) for 20 hours.

23. The flexible ballistic resistant body armor of claim 4, wherein said armor retains at least about 90% of its V50 performance after immersion in tap water at 70° ±5° F. (21° C.±2.8° C.) for 20 hours, when impacted with a 17 grain fragment simulated projectile.

24. The flexible ballistic resistant body armor of claim 23, wherein said armor exhibits a weight increase of not more than about 40% from its dry weight after immersion in tap water at 70° ±5° F. (21° C.±2.8° C.) for 20 hours.

25. The flexible ballistic resistant body armor of claim 4, wherein said armor retains at least about 85% of its V50 performance after immersion in gasoline at 70° F.±5° F. (21° C.±2.8° C.) for 4 hours, when impacted with a 16 grain projectile.

26. The flexible ballistic resistant body armor of claim 4, wherein said armor retains at least about 90% of its V50 performance after immersion in gasoline at 70° F.±5° F. (21° C.±2.8° C.) for 4 hours, when impacted with a 16 grain projectile.

27. The flexible ballistic resistant body armor of claim 4, wherein said thermoplastic polyurethane resin is applied to said composite as a dispersion in water, and has a relative density of 1.05 g/cc at 23° C. and a viscosity of 40 cps at 23° C.

* * * * *